(12) United States Patent
Kuhnke et al.

(10) Patent No.: US 6,447,598 B2
(45) Date of Patent: Sep. 10, 2002

(54) PROCESS FOR THE THERMAL TREATMENT OF MEAL-FORM RAW MATERIALS

(75) Inventors: Stepan Kuhnke, Erftstadt; Carsten Eckert; Andreas Hand, both of Cologne, all of (DE)

(73) Assignee: KHD Humboldt Wedag AG, Köln (DE)

(*) Notice: Subject to any disclaimer, the term of this patent is extended or adjusted under 35 U.S.C. 154(b) by 0 days.

(21) Appl. No.: 09/736,565

(22) Filed: Dec. 13, 2000

(30) Foreign Application Priority Data

Dec. 23, 1999 (DE) .......................... 199 62 536

(51) Int. Cl.[7] ................................ C04B 7/36
(52) U.S. Cl. .............. 106/743; 106/761; 106/762; 431/10
(58) Field of Search .................. 106/743, 761, 106/762; 431/10; 73/23.32

(56) References Cited

U.S. PATENT DOCUMENTS

| | | | |
|---|---|---|---|
| 4,066,470 A | * | 1/1978 | Brachthauser et al. |
| 5,413,476 A | * | 5/1995 | Baukal, Jr. et al. ........... 431/10 |
| 6,077,072 A | * | 6/2000 | Marin et al. ................... 431/10 |
| 6,206,685 B1 | * | 3/2001 | Zamansky et al. ............. 431/4 |

* cited by examiner

Primary Examiner—Paul Marcantoni
(74) Attorney, Agent, or Firm—Sonnenschein Nath & Rosenthal

(57) ABSTRACT

In order to create a process for the economical production of cement clinker in a cement clinker production line with a raw meal preheater, a precalcination stage, a rotary tubular kiln and a clinker cooler, in which the total oxygen excess required for all firing points, i.e., the ratio of total oxygen to total fuel, also designated as $\lambda$ value, is to lie as low as possible, it is proposed according to the invention, to continuously measure the content of CO and/or (unburned) hydrocarbons and/or other combustion products in the exhaust gas path of the precalcination stage and, in dependence on this measurement value, to perform a regulating intervention on the amount of an oxidation agent and/or catalyst to be injected into the precalcination stage.

20 Claims, 1 Drawing Sheet

PROCESS FOR THE THERMAL TREATMENT OF MEAL-FORM RAW MATERIALS

BACKGROUND OF THE INVENTION

The invention relates to a process for the thermal treatment of meal-form raw materials, especially in the production of cement clinker from raw meal which is preheated in at least one heat exchanger train traversed by the exhaust gas of a rotary tubular kiln, calcined in a precalcining stage, and burned into cement clinker in the sintering zone of the rotary tubular kiln, which is cooled in a downstream-engaged cooler, in which process in the pre-calcination stage supplied with fuel, the exhaust gas stream from the rotary tubular kiln, and possibly an exhaust gas stream (tertiary air) of the clinker cooler are used separately or in common for the pre-calcination of the raw meal.

Processes of the type described, known, for example from EP-B-0 497 937, must be capable of producing, in the pre-calcination stage equipped with second-firings upstream-engaged to the rotary tubular kiln, a high-quality calcined raw meal, before introduction into the rotary tubular kiln, and to produce cement clinker with the lowest possible total energy requirement. Simultaneously the builders and operators of cement clinker production lines are confronted with ever sharper demand for low emission values of noxious substances such as CO and $NO_x$.

For the reduction of the harmful substance $NO_x$, it is a known practice to burn fuel substoichiometrically in the rotary kiln exhaust gas riser line, i.e., with oxygen insufficiency, for the purpose of creating a CO-containing reduction zone for the reduction of the harmful substance $NO_x$ which has been formed especially by high-temperature combustion in the rotary tubular kiln (thermal $NO_x$). The CO not consumed in the $NO_x$ reduction zone of the rotary kiln exhaust gas channel, as well as solid-fuel particles at first not burned in the precalinator, are after-burned by the oxygen of a tertiary air stream introduced from the clinker cooler, this residual burning-out being favored by the swan's neck-form flow deflection of the suspension in the re-calcining stage, especially if a turbulence chamber or mixing chamber is also arranged in the region of the flow deflection.

Despite these means, promoting burning-out of the residual substance in the pre-calcination stage it is not, however, entirely excluded in that there can occur cases in which CO thrusts or CO strands can pass with the exhaust gas into the cyclone fluidized gas heat exchanger system, especially with fluctuating solid-fuel dosing to the calcinator as well as with use of co-called secondary fuels, when, as known for example from EP-B-0 439 825, in the cement clinker production process whole scrap tires are disposed of, which should burn in the product inflow zone of the rotary tubular kiln with oxygen excess which, contained in excess secondary air, must be drawn through the entire rotary tubular kiln. Through the thrust-wise scrap-tire burning, undesired CO thrusts occurring there are virtually unavoidable.

Aside from the disadvantage of the incomplete fuel utilization, CO thrusts and unburned hydrocarbons in the exhaust gas of a cement clinker production line endanger, however, the safe operation of an exhaust gas dust remover in the form of an electrostatic dust separator (electrofilter), for which reason such dust separators are equipped with CO exhaust gas analyzers which shut off the electrofilter on occurrence of a CO thrust when an upper CO limit value is exceeded. In order to avoid such switch-offs, as well as CO and unburned hydrocarbons emissions, which would be brought about by local air deficiencies by reason of local unmixed fuel and air, and/or by non-homogeneous air or fuel dosing, cement clinker production lines have been operated by regulating intervention on the suction blower of the total exhaust gas, as a rule with an increased total-oxygen excess or air excess, for example with an air ratio $\lambda$ of 1.3 instead of $\lambda$ being, for example, 1.1 to 1.2, which through increased fuel and current costs endangers the economical operation of the cement clinker production line and which has a negative effect on the $No_x$ emissions.

SUMMARY OF THE INVENTION

Underlying the invention is the problem of creating a process for the economical production of cement clinker in a cement clinker production line with raw meal preheater, a precalcination stage, a rotary tubular kiln, and a clinker cooler, in which system the total oxygen surplus necessary for all combustion points, i.e., the ratio of total oxygen to total fuel, often designated as $\lambda$-value, lies as low as possible, without the possibility that even with use of unevenly dosed secondary fuels, undesirably high peaks and emissions of CO and/or unburned hydrocarbons occur.

In the process of the invention it is proposed, in the exhaust gas path of the precalcination stage of the cement clinker production installation, to measure continuously the content in CO and/or (unburned) hydrocarbons and/or $NO_x$ and/or other combustion products ($CO_2$, $O_2$, $H_2O$) and, in dependence on this measurement value, perform a regulating intervention on the amount of the oxidation agent and/or catalyst to be sent into the precalcination stage, in such manner that, with rising CO and/or unburned hydrocarbons content, the injected amount of oxidation agent and/or catalyst is increased, and vice versa. If in the measuring an increase of the CO and/or unburned hydrocarbon content is ascertained, for example on the occasion of an above-described CO thrust occurring, then upon exceeding a predetermined upper limit value, for example 1.6 to 1.8% of CO in the area of the precalcination stage in which the residual burning-out as well as the residual calcination is to occur, the oxidation agent and/or the catalyst is/are injected for the acceleration of the chemical oxidation reaction process, in which case the injected amount is governed according to the requisite CO and/or unburned hydrocarbons decomposition, until a lower limit value of, for example 1.0% of CO is measured.

The injection time point, as well as the injected amount of oxidation agent and/or catalyst, can be determined not only from the exhaust gas analysis, but also by a tendency value which is calculated by a computer from the actual relations of fuel to oxygen determined at each and all combustion points of the cement clinker production line. In any case, the measurement values or computing values should be available without time lag after as short as possible a measuring time, in order to keep the consumption of oxidation agent and/or catalyst as low as possible.

As an oxidation agent accelerating the chemical reaction course of the oxidation in the cement clinker production line, there can be used air, air enriched with $O_2$, and/or pure oxygen, and/or a substance from the peroxide group, for example hydrogen peroxide, and/or a substance from the perborate group, for example sodium perborate, and/or from the permanganate group, for example potassium permanganate, and/or from the nitrate group, for example potassium nitrate, and/or from the halogenates, for example potassium perchlorate, and/or oxides and oxo-acids of the halogens, for example perchloric acid, and/or nitric acid, and/or nitrotoluenes, such acid-containing compounds relatively easily giving off their oxygen, especially on heating. As a catalyst there can be used fine granular substances that further the combustion reaction and are usable in the cement clinker production process, such as, for example, certain cement raw meals and/or raw meal components and/or related-group elements and their compounds, such as, for example, iron oxide or its metallorganic compounds.

With the process of the invention there are achieved at least the throwing advantages:

The cement clinker production is economical because the combustion processes occur in the cement clinker production line, especially also in the precalcination stage with as low as possible an oxygen excess. The exhaust gas losses are minimized; the avoidance of CO peaks in the exhaust gas leads to less frequent switchings-off of electrofilters. Finally, in the cement clinker production process of the invention there can also be used difficultly dosable secondary fuels and/or lumpy fuels such as, for example, whole used tires without danger; i.e., even severe fluctuations in the type of fuel supplied is controllable. From the process of the invention also cement clinker burning installations can profit when a fuel gasification reactor is used in which secondary fuels with fluctuating fuel qualities are gasified. Finally, through the regulated injection of the oxidation agent and/or catalyst used, the substances used there can simultaneously be beneficially disposed of.

BRIEF DESCRIPTION OF THE DRAWINGS

The invention and its further features and advantages are explained in detail with the aid of the embodiment of the invention schematically represented in the drawing.

DETAILED DESCRIPTION OF THE PREFERRED EMBODIMENTS

Figure 1:
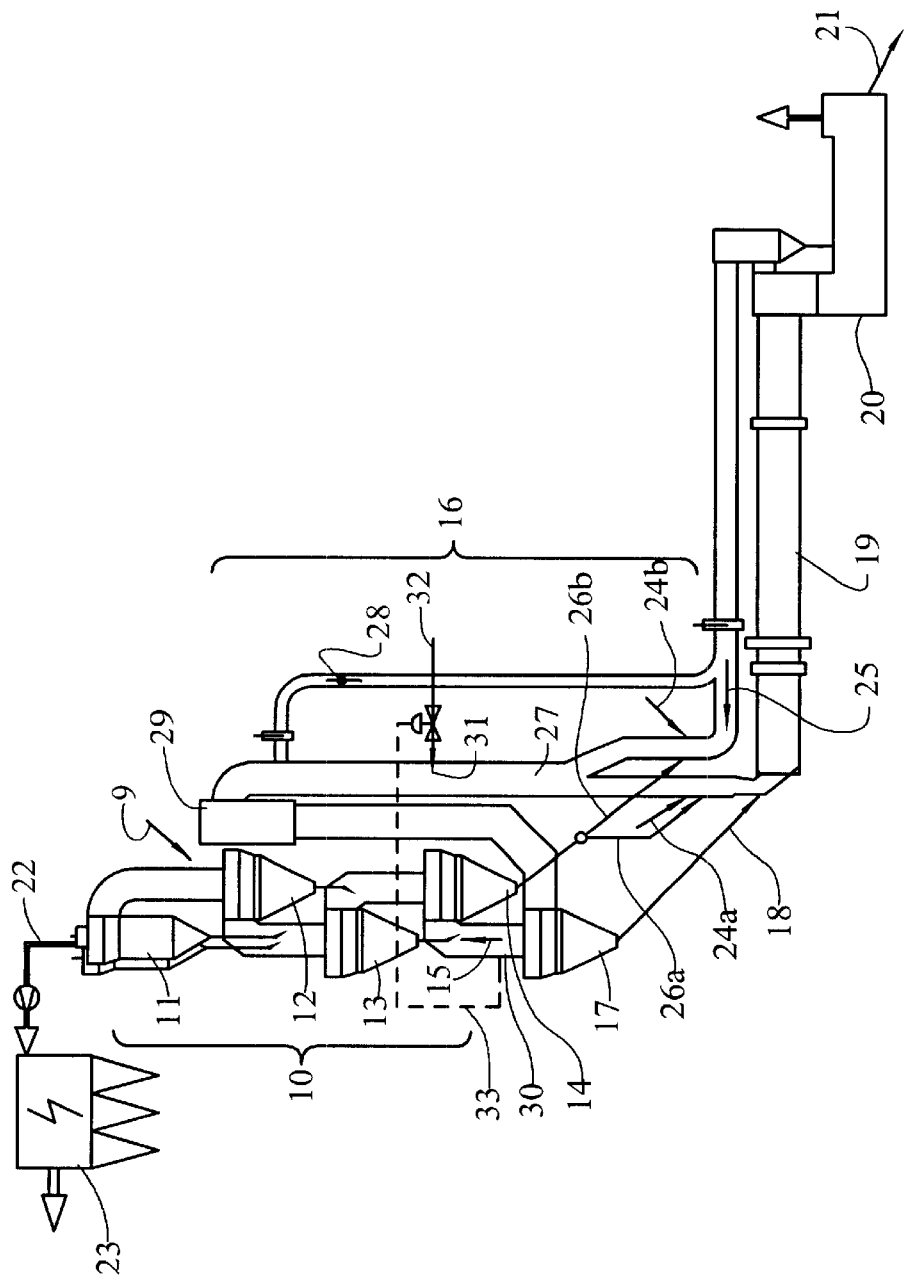

The drawing shows in schematic representation an installation suited for the execution of the inventive process for the production of cement clinker from cement raw meal, which is fed at 9 into the preheating stage 10, where it passes successively through the cyclone fluidized gas heat exchangers 11 to 14 in combined flow-and-counterflow to the hot exhaust gas 15 of a precalcinating stage 16, in order to be separated, in the lowest cyclone 17, from the hot exhaust gas stream 15 and to be introduced as high-quality (for example 95%) calcined cement raw meal 18 into the inflow chamber of the rotary tubular kiln 19, in the sintering zone of which it is burned into cement clinker, which is thereupon cooled in a clinker cooler 20, for example a grate cooler. The cooled cement clinker leaves the cooler 20 at 21.

The exhaust gas cooled on the cement raw meal leaves the preheating stage 10 of the installation at 22. This exhaust gas 22 is freed from dust in a dust separator, as a rule an electrostatic dust separator 23 (electrofilter) and thereupon it is drawn off as exhaust gas over a main chimney (not represented in the drawing).

In the precalcination stage 16 supplied with fuel 24a, 24b and with tertiary air 25 from the clinker cooler, the preheated cement meal 26a, 26b emerging from the second-lowest cyclone stage 14 is calcined to a high degree. There the fuel 24a coming from the rotary kiln 19 is advantageously burned sub-stoichiometrically for the purpose of generating a CO-containing reduction zone, reducing the harmful substance $NO_x$ contained in the kiln exhaust gas, while the fuel 24b in the tertiary air coming from the clinker cooler is advantageously burned super-stoichiometrically. The residue burnout of the CO at first in excess in the reduction zone 27, and of hydrocarbon substances that possibly remained unburned, is to occur by oxygen from excess tertiary air 25, as well as from a further partial tertiary air stream 28 that is introduced into a higher-situated level of the calcining stage 16. For the purpose of intensive mixing of the reactants, in the area of the flow deflection of the swan's-neck form calcining stage there can still be arranged a turbulence chamber or mixing chamber 29.

In the path of the exhaust gas 15 of the precalcinator at a measuring point 30, there is continuously measured the CO and/or the unburned hydrocarbons, and/or other combustion products ($CO_2$, $O_2$, $H_2O$) contained in the exhaust gas 15, and, namely, a measuring apparatus with which the analysis result is available without time lag. In dependence on this measurement value a regulating of the quantity can occur as to the amount of an oxidation agent and/or catalyst 32 to be injected into the precalcination stage 16, say at the point 31 of the rising pipeline branch 32. By the injected agent the oxidation chemical reaction rate in the calcination stage 16 supplied with fuel is accelerated, whereby the content in CO measured in the exhaust gas flow can be prevented from exceeding a predetermined maximum of, for example, 1.6% to 1.8%. On a clear falling below this maximal value, the injection of the oxygen carrier and/or catalyst is again halted. The injection, therefore, occurs discontinuously. The signal line from the measuring point 30 to the regulating device of the oxidation agent/catalyst 32 is indicated with reference numeral 33.

The oxidation agent/catalyst 32 could also be introduced, at least partly, into the tertiary air 25 instead, or also into the raw meal 26a, 26b to be treated, instead of into the exhaust gas.

The invention is also usable for cement clinker production lines that operate with only one firing (primary firing) in the rotary tubular kiln, in which, however, the dosing of the fuels and/or their heating values are subject to such great fluctuations that hereby increased emissions or CO and/or unburned hydrocarbons can arise. The invention is usable, furthermore, in processes in which the secondary fuel is introduced into the kiln inflow or over a sluice into the rotary kiln.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A process for the thermal treatment of meal-form raw materials, in the production of cement clinker from raw meal which is preheated in at least one heat exchanger train traversed by an exhaust gas stream of a rotary tubular kiln, is calcinated in a precalcination stage, and is burned into cement clinker in a sintering zone of the rotary tubular kiln, which is cooled in a downstream-engaged cooler, in which system in the precalcination stage the exhaust gas stream of the rotary tubular kiln is used for the precalcination of the raw meal, comprising:

continuously measuring the content of at least one of CO, hydrocarbons, $NO_x$ and other combustion products in said exhaust gas stream, and in dependence on this measured value, intervening and regulating an amount of at least one of an oxidation agent and catalyst to be injected into the exhaust gas stream, in such manner that upon measuring a rising content in such combustion products, the injected amount of said oxidation agent and/or catalyst is increased, and vice versa to precalcinate the raw meal with a low oxygen ratio within the precalcination stage.

2. A process according to claim 1, wherein said raw meal is preheated in a cyclone fluidized gas heat-exchanger system.

3. A process according to claim 1, wherein an exhaust air stream from the clinker cooler is used separately from the exhaust gas stream of the rotary tubular kiln for the precalcination of the raw meal.

4. A process according to claim 1, wherein an exhaust air stream from the clinker cooler is used together with the exhaust gas stream of the rotary tubular kiln for the precalcination of the raw meal.

5. A process according to claim 1, wherein the amount of oxidation agent and/or catalyst injected is determined by a degree of decomposition of said measured combustion products which are measured in an exhaust gas path of the precalcination stage, for the purpose of maintaining set limit values.

6. A process according to claim 1, including the step of calculating a tendency value from the actual ratios of fuel to oxygen determined in each case at all the firing points of the cement clinker production line, for the regulating intervention on the injected amount of oxidation agent and/or catalyst.

7. A process according to claim 6, wherein the step of calculating is used in addition to the measured amount of combustion products for said step of regulating.

8. A process according to claim 1, wherein an oxidation agent is used comprising at least one of air, air enriched with $O_2$, pure oxygen, peroxides, perborates, permanganates, and halogenates.

9. A process according to claim 1, wherein a catalyst is used which is a fine-granular substance furthering the combustion reaction that is usable in the cement clinker production process.

10. A process for the thermal treatment of meal-form raw materials, especially in the production of cement clinker from raw meal which is preheated in at least one heat exchanger train traversed by an exhaust gas stream of a rotary tubular kiln, is calcinated in a precalcination stage, and is burned into cement clinker in a sintering zone of the rotary tubular kiln, which is cooled in a downstream-engaged cooler, in which system in the precalcination stage the exhaust gas stream of the rotary tubular kiln is used for the precalcination of the raw meal, comprising:

calculating a tendency value from actual ratios of fuel to oxygen determined in each case at all firing points of the cement clinker production line, in dependence on this calculated value, intervening and regulating an amount of at least one of an oxidation agent and catalyst to be injected into the exhaust gas stream, in such manner that upon calculating a rising content in such combustion products, the injected amount of said oxidation agent and/or catalyst is increased, and vice versa; and further precalcinating the raw meal with at least one additional exhaust gas stream.

11. A process for the thermal treatment of meal-form raw materials, in the production of cement clinker from raw meal which is calcined in a precalcination stage, in which system in the precalcination stage an exhaust gas stream of a kiln is used for the precalcination of the raw meal, comprising:

measuring a content of combustion products in said exhaust gas stream, and in dependence on this measured value, intervening and regulating an amount of at least in dependence on this measured value, intervening and regulating an amount of at least one of an oxidation agent and catalyst to be injected into the exhaust gas stream wherein the amount of oxidation agent and/or catalyst injected is determined by a degree of decomposition of said measured combustion products which are measured in an exhaust gas path of the precalcination stage, for the purpose of maintaining set limit values.

12. A process according to claim 11, wherein said raw meal is preheated in at least one heat exchanger train traversed by the exhaust gas of the kiln.

13. A process according to claim 11, wherein said raw meal is burned into cement clinker in a sintering zone of a rotary tubular kiln.

14. A process according to claim 13, wherein said cement clinker is cooled in a downstream engaged cooler.

15. A process according to claim 14, wherein an exhaust air stream (tertiary air) from the clinker cooler is used separately from the exhaust gas stream of the rotary tubular kiln for the precalcination of the raw meal.

16. A process according to claim 14, wherein an exhaust air stream (tertiary air) from the clinker cooler is used together with the exhaust gas stream of the rotary tubular kiln for the precalcination of the raw meal.

17. A process according to claim 11, including the step of calculating a tendency value from the actual ratios of fuel to oxygen determined in each case at all the firing points of the cement clinker production line, for the regulating intervention on the injected amount of oxidation agent and/or catalyst.

18. A process according to claim 17, wherein the step of calculating is used in addition to the measured amount of combustion products for said step of regulating.

19. The process according to claim 10, wherein the at least one additional exhaust gas stream is used separately from the exhaust gas stream of the rotary tubular kiln.

20. The process according to claim 10, wherein the at least one additional exhaust gas stream is used together with the exhaust gas stream of the rotary tubular kiln.

* * * * *